United States Patent
Pitcher

(10) Patent No.: US 10,636,131 B2
(45) Date of Patent: Apr. 28, 2020

(54) INSPECTION VIDEO RADIATION FILTER

(71) Applicant: Framatome Inc., Lynchburg, VA (US)

(72) Inventor: Gary J. Pitcher, Forest, VA (US)

(73) Assignee: Framatome Inc., Lynchburg, VA (US)

( * ) Notice: Subject to any disclaimer, the term of this patent is extended or adjusted under 35 U.S.C. 154(b) by 336 days.

(21) Appl. No.: 15/285,290

(22) Filed: Oct. 4, 2016

(65) Prior Publication Data

US 2017/0024878 A1    Jan. 26, 2017

Related U.S. Application Data

(63) Continuation of application No. 12/773,616, filed on May 4, 2010, now abandoned.

(51) Int. Cl.

| | |
|---|---|
| *G06T 5/20* | (2006.01) |
| *G06T 7/00* | (2017.01) |
| *G06T 5/50* | (2006.01) |
| *G06T 5/00* | (2006.01) |
| *H04N 5/367* | (2011.01) |
| *G01T 7/00* | (2006.01) |
| *G06K 9/46* | (2006.01) |
| *G06K 9/62* | (2006.01) |

(Continued)

(52) U.S. Cl.
CPC ............ *G06T 7/0004* (2013.01); *G01T 7/00* (2013.01); *G06K 9/4661* (2013.01); *G06K 9/6202* (2013.01); *G06T 5/005* (2013.01); *G06T 5/20* (2013.01); *G06T 5/50* (2013.01); *H04N 5/3675* (2013.01); *H04N 5/372* (2013.01); *G06T 2207/10016* (2013.01); *G06T 2207/20221* (2013.01); *G06T 2207/30164* (2013.01); *H04N 17/002* (2013.01); *H04N 2005/2255* (2013.01)

(58) Field of Classification Search
CPC .... G06T 5/50; G06T 2207/10016; G01T 7/00
USPC .......................................... 348/82, 187, 250
See application file for complete search history.

(56) References Cited

U.S. PATENT DOCUMENTS

| | | | |
|---|---|---|---|
| 4,523,231 A | 6/1985 | Therrien | |
| 4,805,023 A | 2/1989 | Younse et al. | |

(Continued)

FOREIGN PATENT DOCUMENTS

WO    WO 2006091928    8/2006

OTHER PUBLICATIONS

Jai-Wan Cho, "A CCD Camera Lens Degradation Caused by High Dose-Rate Gamma Irradiation", vol. 58, No. 7, Jul. 2009.*

(Continued)

*Primary Examiner* — Nguyen T Truong
(74) *Attorney, Agent, or Firm* — Davidson, Davidson & Kappel, LLC

(57) ABSTRACT

A method for filtering radiation on a CCD based camera inspection video, the method including: capturing video signals via the camera; converting the video signals to a plurality of digital video frames; identifying radiation bright spots, defined as xnoids, in a pixel of at least one of the frames, replacing the xnoids and surrounding pixels with corresponding pixels of another of the frames to create a filtered frame. A system for the inspection of a nuclear power plant comprising: a camera; and a computer, the computer configured to execute identifying xnoids in a pixel of at least one digitized video frame and replacing the xnoids and surrounding pixels with corresponding pixels of another of the frames to create a filtered frame.

11 Claims, 3 Drawing Sheets

(51) Int. Cl.
    *H04N 5/372*     (2011.01)
    *H04N 17/00*     (2006.01)
    *H04N 5/225*     (2006.01)

(56) References Cited

U.S. PATENT DOCUMENTS

| | | |
|---|---|---|
| 4,969,042 A | 11/1990 | Houtman et al. |
| 5,153,924 A * | 10/1992 | Van Tyne, Sr. .......... G06K 9/38 |
| | | 382/270 |
| 5,748,234 A | 5/1998 | Lippincott |
| 5,809,105 A | 9/1998 | Roehm et al. |
| 6,307,393 B1 | 10/2001 | Shimura |
| 6,489,996 B1 | 12/2002 | Matsumura et al. |
| 7,145,150 B2 * | 12/2006 | Chugg ....................... G01T 7/00 |
| | | 250/370.01 |
| 7,391,028 B1 | 6/2008 | Rubenstein |
| 7,965,816 B2 * | 6/2011 | Kravis ................. G01V 5/0016 |
| | | 378/57 |
| 2001/0010552 A1 | 8/2001 | Nakajima |
| 2004/0252201 A1 | 12/2004 | Meitav et al. |
| 2007/0013795 A1 | 1/2007 | Sakamoto et al. |
| 2007/0126869 A1 | 6/2007 | Montminy et al. |
| 2008/0117318 A1 | 5/2008 | Aoki |
| 2009/0220009 A1 | 9/2009 | Tomita et al. |

OTHER PUBLICATIONS

European Search Report for corresponding European Patent Application 11 16 4631.

\* cited by examiner

INSPECTION VIDEO RADIATION FILTER

This is a continuation of U.S. patent Ser. No. 12/773,616, filed May 4, 2010, which is hereby incorporated by reference herein.

The present invention relates generally to nuclear power plants, and more particularly to the visual inspections of nuclear power plants.

BACKGROUND

Video cameras are known to be used as inspection devices in nuclear power plants. Videos taken during visual inspection of nuclear power plants are susceptible to interference from high levels of radiation reaching the camera. Such interference slows visual inspections and may limit coverage in high radiation areas.

High cost radiation tolerant tube base cameras are typically used to capture video in high radiation areas. Lower cost CCD (charge coupled device) based cameras are also used however, these cameras provide a more impaired image and are more prone to failure from the effects of radiation.

SUMMARY OF THE INVENTION

An object of the present invention is to increase the speed, quality and coverage of nuclear power plant visual inspections, as well as using a lower cost camera and reducing the camera failure rate during inspection.

The present invention provides a method for filtering radiation effects on a CCD based camera inspection video, the method including: capturing video signals via the camera; converting the video signals to a plurality of digital video frames; identifying radiation bright spots, defined as xnoids, in pixels of at least one of the frames, replacing the corrupted pixels with corresponding pixels of another of the frames to create a filtered frame.

The present invention also provides a system for the inspection of a nuclear power plant comprising: a camera; and a computer, the computer configured to execute identifying radiation bright spots, defined as xnoids, in a pixel of at least one digitized video frame and replacing corrupted pixels with corresponding pixels of another of the frame to create a filtered frame.

The present invention also provides a method for calculating estimated relative absorbed dose of the video camera by counting the total number of xnoids detected. The estimated relative dose can be used to predict camera failure due to radiation exposure.

BRIEF DESCRIPTION OF THE DRAWINGS

An embodiment of the present invention is shown with respect to the drawings in which.

DETAILED DESCRIPTION

Figure 1A:
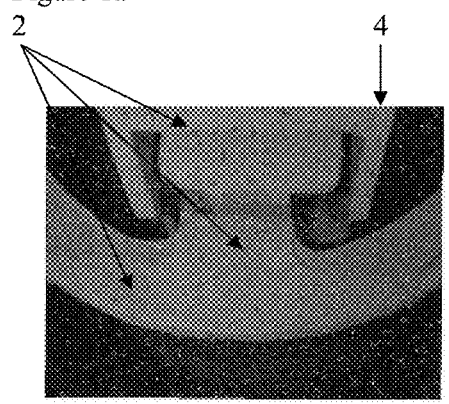
FIG. 1a shows a video frame with radiation interference.

A method is provided for dynamically filtering the effects of radiation on inspection videos when using CCD based cameras. The interference caused by radiation during the video inspection of a nuclear power plant manifests itself as "bright" spots, called xnoids, within the video frames. FIG. 1a shows xnoids 2 in video frame 4.

Figure 1B:
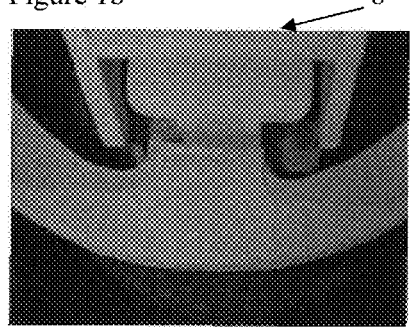
FIG. 1b shows a video frame similar to 1a without radiation interference.
Figure 2:
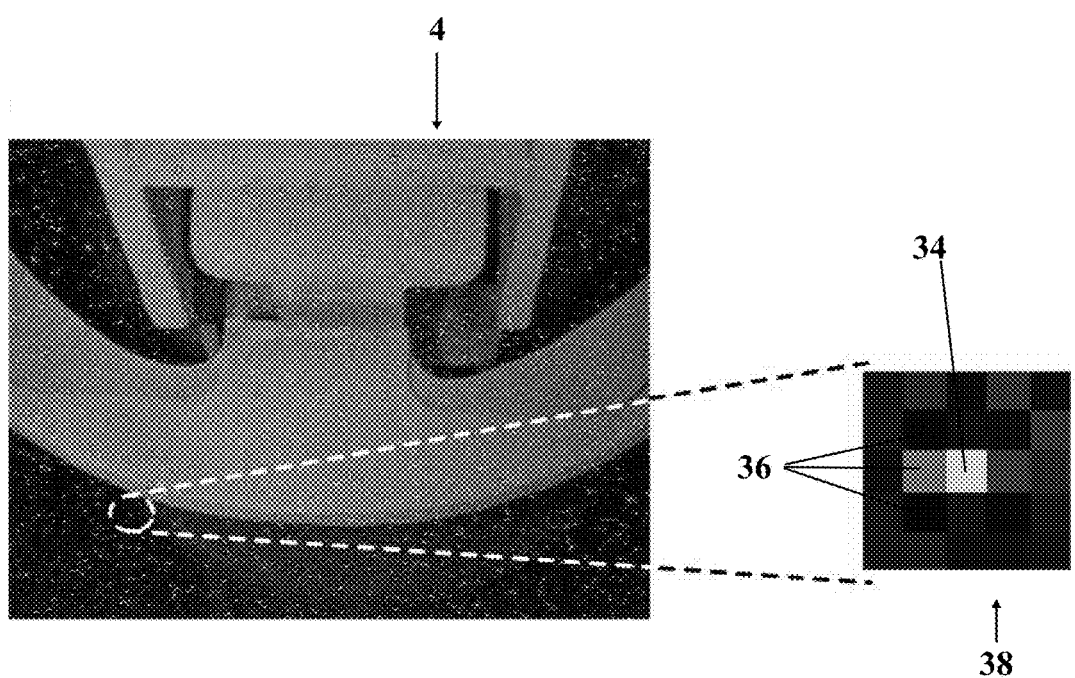
FIG. 2 shows an exemplary video frame and pixel matrix with a bright spot.

Radiation filtering is accomplished by checking each pixel in each frame of video for xnoids. Once a xnoid is detected, the xnoid and surrounding pixels are replaced with corresponding pixels from other frames. For example, FIG. 2 shows video frame 40 with pixels 38. Xnoid 34 and surrounding pixels 36 would be replaced with corresponding pixels from other frames. FIG. 1b shows a video frame 6 in which the xnoids 2 have been filtered and replaced. With use of a computer equipped with a video capture card, the video can be captured, filtered and displayed in real-time with a delay of only a few frame times. Alternately, the video can be stored and then replayed from the captured digital file with a similar delay of zero to a few frame times.

Figure 3:
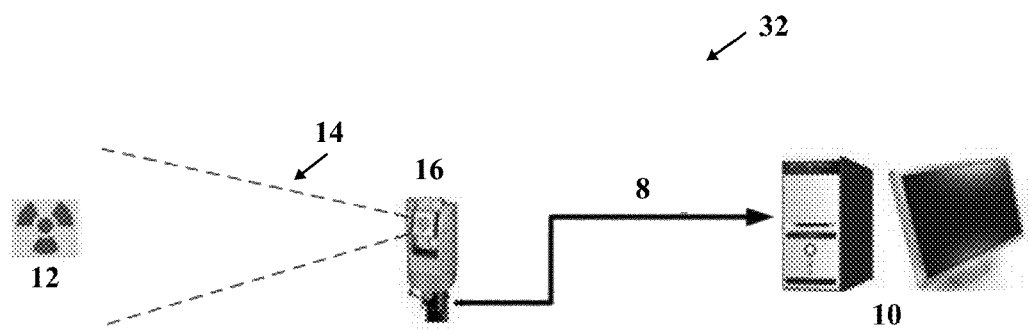
FIG. 3 shows an inspection system of the present invention.
Figure 4:
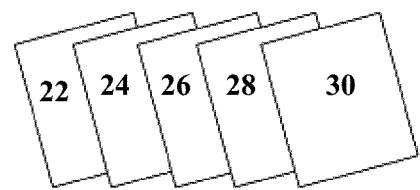
FIG. 4 shows exemplary video frames from a video capture card.

FIG. 3 shows an inspection system 32 which comprises a CCD based camera 16 and a computer 10. Camera 16 captures an image which includes a radiation source 12 when it is in the field of view 14 of camera 16. Video signal 8 of camera 16 is transferred from camera 16 to computer 10. Computer 10, may for example, include a video capture card, a multi core CPU, a hard drive and a display. Video capture card in computer 10 converts video signal 8 to digital video frames 22, 24, 26, 28, 30 (FIG. 4) at a specified frame rate. Each digitized video frame 4 contains a matrix of pixels. Each pixel contains an intensity level for each color—red, green, blue, or just a single grey level for black and white frames. These video frames 22, 24, 26, 28, 30 are passed to a radiation filter module 18. Module 18 is preferably a software executed on computer 10. The intensity level for each pixel is compared by module 18 against a threshold to a plurality of surrounding pixel intensity levels, for example 4 pixels, 8 pixels, 24 pixels, etc. If the pixel is brighter than the surrounding pixels, it is identified as a xnoid. Radiation filter module 18 checks each pixel in each frame of video for a xnoid. Once a xnoid is detected, the xnoid and surrounding pixels are replaced with corresponding pixels in the same location from other frames. For each pixel marked as a xnoid in video frame 26, the pixel xnoid, and the surrounding pixel values are replaced with pixel intensity values in the same locations as frame 28. If replacement pixel of frame 28 has already been marked as a xnoid (or is a surrounding pixel of a xnoid) then the xnoid pixel and surrounding pixels of frame 26 are replaced with the pixels of frame 24, frame 30 or frame 22, respectively. If no replacement pixel is available, then no pixel replacement takes place. Radiation filter module 18 filters the effects of the radiation and passes filtered video frames to the display. In addition, radiation filter module 18 can write the xnoid location information along with the unfiltered video frame to a video file stored on the hard drive of computer 10.

Computer 10 may be used both to view live video and/or to store the video for later review. To review a video, only computer 10 is necessary.

The number of xnoids per video frame can be correlated to the absorbed dose of radiation of the camera CCD. By counting the total xnoids per video frame, an estimate of absorbed dose can be recorded for a specific camera. Using historical data for specific camera types, camera failure can be predicted by comparing previous camera life time estimated absorbed dose against current estimated absorbed dose. Dynamically filtering the effects of radiation on CCD based camera video can increase the speed, quality and coverage of nuclear power plant visual inspections and allows lower cost CCD cameras to be used for nuclear power plant visual inspections. Using estimated camera absorbed dose and projected camera life, camera failure during inspection can be reduced.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for filtering radiation on a CCD based camera inspection video, the method comprising:
   providing the CCD based camera in a nuclear power plant, the
   capturing video signals in the nuclear power plant via the camera;
   converting the video signals to a plurality of digital video frames;
   checking pixels in each of the digital video frames and comparing an intensity level for each pixel to pixel intensity levels of a plurality of surrounding pixels;
   identifying each pixel as being a radiation bright spot caused by interference from radiation in the nuclear power plant if the pixel is brighter than the surrounding pixels;
   creating a filtered video without effects of the radiation by replacing the radiation bright spots and surrounding pixels with intensity values of corresponding pixels of another of the frames to create a filtered frame; and
   displaying the filtered video via a computer.

2. The method as recited in claim 1 wherein the video signals are converted to digital video frames by a video capture card.

3. The method as recited in claim 1 wherein the filtered frame is shown in real time via a computer display.

4. The method as recited in claim 1 wherein data of the filtered frame is stored on a computer component and replayed at a later timer.

5. The method as recited in claim 4 wherein the another frame is a frame directly following the frame having the radiation bright spot.

6. The method as recited in claim 5 wherein the another frame is a frame directly proceeding the frame having the radiation bright spot, a frame two frames after the frame having the radiation bright spot or a frame two frames before the frame having the radiation bright spot, respectively, when the digital video frame directly following the frame having the radiation bright spot has already been marked as a radiation bright spot.

7. The method as recited in claim 1 wherein identifying radiation bright spots includes determining an intensity level for the pixel and comparing the intensity level of the pixel to an intensity level of a plurality of surrounding pixels, identifying the pixel as a radiation bright spots when the intensity level of the pixel is brighter than the intensity level of the plurality of surrounding pixels.

8. The method as recited in claim 1 wherein identifying the radiation bright spots includes comparing an intensity level of the pixel to an intensity level of twenty four surrounding pixels, wherein the bright spot exists when the intensity level of the pixel is greater than the intensity level of the twenty four surrounding pixels.

9. A system for the inspection of a nuclear power plant comprising:
   a camera capturing video signals in the nuclear power plant; and
   a computer, the computer configured with software to execute the following steps:
   convert the video signals to a plurality of digital video frames;
   check pixels in each of the digital video frames and comparing an intensity level for each pixel against a threshold to pixel intensity levels of a plurality of surrounding pixels;
   identify each pixel as being a radiation bright spot caused by interference from radiation in the nuclear power plant if the pixel is brighter than the surrounding pixels;
   filter the effects of the radiation by replacing the radiation bright spots and surrounding pixels with intensity values of corresponding pixels of another of the frames to create a filtered frame; and
   display the filtered video.

10. The system as recited in claim 9 wherein the camera is a CCD based camera.

11. A method for predicting camera failure due to radiation exposure, the method comprising:
    checking pixels in each of the digital video frames and comparing an intensity level for each pixel against a threshold to pixel intensity levels of a plurality of surrounding pixels;
    identifying each pixel as being a radiation bright spot caused by interference from radiation in the nuclear power plant if the pixel is brighter than the surrounding pixels;
    calculating a current estimated relative absorbed radiation dose of the video camera by counting the total number of radiation bright spot identified;
    recording the current estimated absorbed radiation dose of the video camera; and
    predicating failure of the camera by comparing the current estimated relative absorbed radiation dose to a previously recorded estimated relative absorbed radiation dose.

* * * * *